Patented Jan. 11, 1944

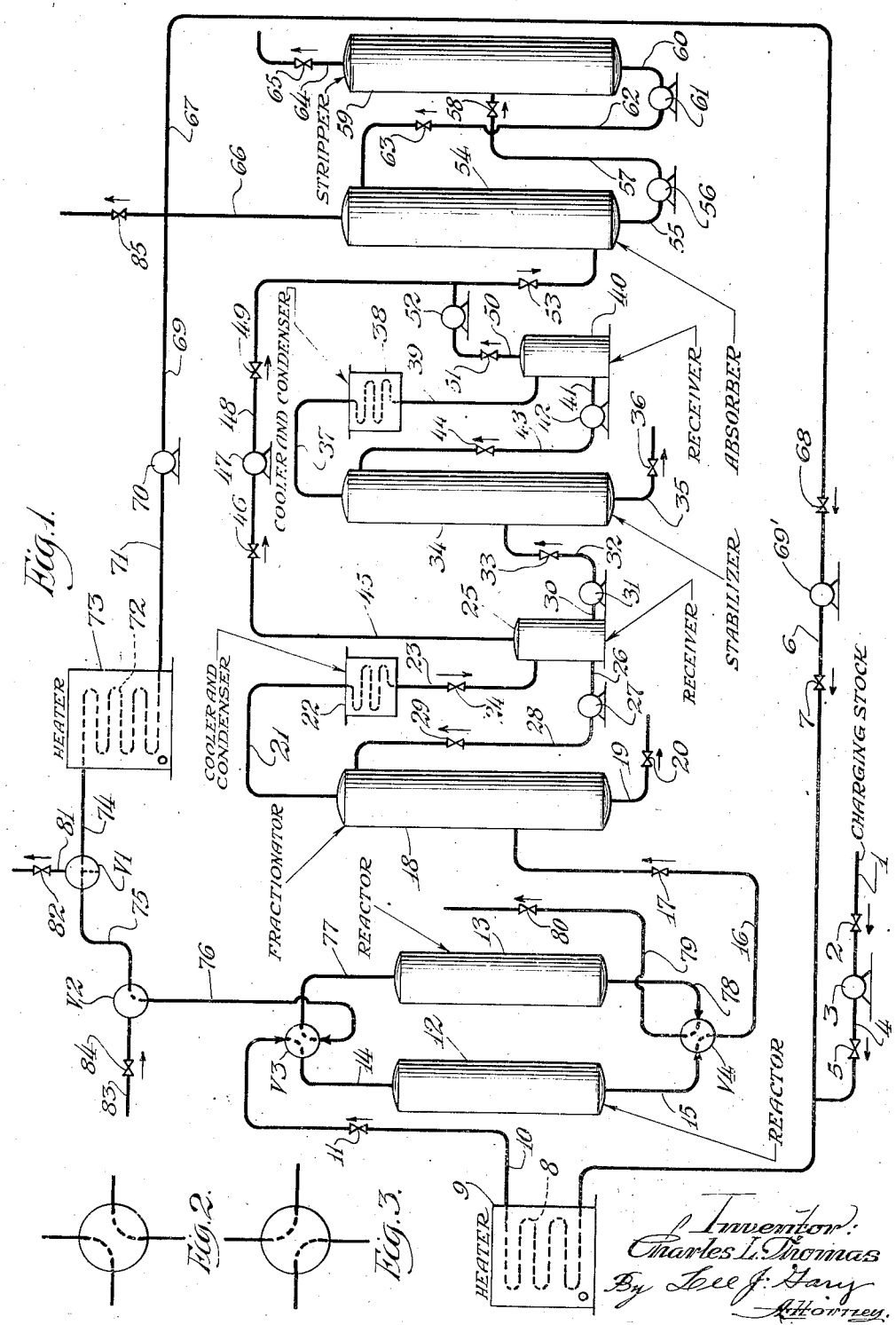

2,338,881

UNITED STATES PATENT OFFICE 2,338,881

REACTIVATION OF SPENT CATALYSTS

Charles L. Thomas, Chicago, Ill., assignor to Universal Oil Products Company, Chicago, Ill., a corporation of Delaware Application November 12, 1940, Serial No. 365,222

1 Claim. (Cl. 252—242)

This invention relates to the reactivation of catalysts used in the conversion of petroleum hydrocarbons. More specifically it is concerned with a process for reactivating catalysts used in the reforming of low octane gasoline or naphthas to increase the octane number thereof.

When reforming gasoline and/or naphtha fractions, relatively large amounts of carbon, or rather carbonaceous materials, are deposited upon the catalyst, thereby lowering its activity and life and necessitating frequent removal of said contaminating deposits in order to restore the activity of the catalyst. In certain reforming operations it has been found desirable to mix hydrogen-containing gases with the charging stock in order to hydrogenate these carbonaceous deposits as they are being formed and thus increasing the length of the conversion portion of the operating cycle. Although the admixture of hydrogen with the charging stock reduces the amount of carbonaceous material deposited on the catalyst, under normal conditions of reforming operaitons the contamination of the catalyst is not entirely prevented and the use of the catalyst is intermittent, that is, a conversion period is followed by a regeneration period.

It has already been proposed to reactivate catalysts contaminated by hydrocarbon conversions by a hydrogenation process, but I have found by experiment that such a treatment does not completely rejuvenate catalysts used in the reforming operations with which my invention is concerned. One of the disadvantages inherent in the use of oxygen for reactivating spent catalyst is the liberation of rather large quantities of heat which may raise the temperature of the catalyst to such a point so as to seriously damage it. The removal of the heat liberated in this way complicates design problems arising in the construction of the reactors. In the process comprising my invention a considerable portion of the carbonaceous deposits is removed by hydrogenation, which step results in the liberation of smaller quantities of heat with a smaller risk of damaging the catalyst and with less trouble removing the heat.

In one specific embodiment my invention comprises a process for reactivating a catalyst used in increasing the octane number of a motor fuel fraction comprising the steps of subjecting said used catalyst to the action of hydrogen-containing gas under conditions suitable for the hydrogenation of substantial portions of the contaminated carbonaceous deposits followed by subjecting the partially reactivated catalyst to the action of an oxygen-containing gas under conditions suitable for the oxidation of the remaining carbonaceous deposits and restoring the activity of the catalyst.

While my invention is not to be regarded as limited to any particular type of catalyst, it comprises the use of such catalysts as those prepared by compositing a relatively minor proportion of an oxide of an element selected from the members of the left-hand columns of groups IV, V and VI of the periodic table with a relatively larger proportion of a refractory carrier, such as alumina, magnesia and silica. Thoria is another suitable carrier which may be composited with an oxide selected from the left-hand columns of groups V and VI. A convenient method of preparing the composite catalyst consists in impregnating the major and less active constituent with a solution of some soluble salt of the more active constituent, as for example, the nitrates, evaporating the mixture to dryness followed by ignition at a controlled temperature. An alternate method of preparation, though sometimes less preferable, consists in mechanically mixing carrier particles with the more active constituent, the latter being either in the wet or dry condition.

In the reforming process referred to in my invention, the gasoline or naphtha fraction is subjected to a catalyst of the above mentioned type at a temperature within the approximate range of 750–1200° F. under a pressure which may vary from substantially atmospheric to as much as 1000 pounds per square inch, although at these higher pressures less satisfactory results are obtained than at pressures, as for example 15–300 pounds per square inch.

As hereinbefore set forth, the charging stock may be processed either alone or after admixture with hydrogen-containing gases. The use of hydrogen-containing gases during the process period will usually be found advisable as they result in a very considerable reduction in the carbonaceous deposits formed during the processing period and with consequent lengthening of the processing portion of the cycle. The use of hydrogen during the processing step also has the advantage of producing a product of a low bromine number and consequently greater susceptibility to increase in octane number by addition of tetra-ethyl lead. The proportion of hydrogen-containing gases to charging stock usually lies within the approximate limits of 0.5–15 mols of hydrogen per mol of charging stock. The space velocities used in the conversion step are usually within the approximate limits of 0.2-40 volumes of liquid charging stock per hour per unit volume of catalyst. The optimum space velocity is a function of temperature, pressure and charging stock, but the values used usually lie within the range stated.

Fig. 1 in the accompanying drawing illustrates diagrammatically one specific form of apparatus in which the process of my invention may be conducted.

Charging stock for the process which may comprise gasoline or naphtha is supplied to the system by way of line 1 controlled by valve 2 from which it enters pump 3, discharging into line 4 controlled by valve 5. After passing through valve 5, the charging stock enters line 6 wherein it is commingled with a hydrogen-containing gas and the mixture directed to heating coil 8 which is so disposed as to receive heat from furnace 9. The heated products are discharged from coil 8 at a temperature within the approximate limits of 750–1200° F. by way of line 10 and after passing through valve 11 pass through a four-way valve V—3 which is in the position shown by Fig. 2. After passing through valve V—3, the reactants enter reactor 12 wherein they are subjected to contact with a catalyst of the type hereinbefore set forth. In the particular flow diagram illustrated in the drawing, two reactors operating in parallel are employed. Each reactor may contain a plurality of tubes containing the catalytic material. These reactors may be equipped with means for introducing a fluid heating or cooling medium around the tubes for the purpose of supplying heat to, or removing heat from, the reaction zone. It is not intended that the invention should be limited in this respect as adiabatic reactors may be used. In such cases the catalyst is supported on a bed or a series of beds or trays in an insulated chamber. In the adiabatic process the heat absorbed in the conversion process and the heat liberated in the regeneration step are taken from the hydrocarbon reactants or given up to the regenerating gases, respectively. When employing two reactors, one is at all times used as a reacting zone while the catalyst in the other is being reactivated as hereinafter set forth. The reactors are alternately operated with respect to the service for which they are employed by means of valves V—1 and V—3 through which reactants and reactivating gases are supplied and withdrawn.

Any suitable valve arrangement capable of switching the reacting flow of the steam of reactants and the stream of regenerating gases may be employed within the scope of the invention and for the sake of simplifying the description and illustrating the process without unnecessary complications, the two switching valves V—3 and V—4 are herein illustrated as single four-way valves in which the position of the two passageways therethrough may be shifted as illustrated in Figs. 2 and 3. Assuming that the valve V—3 is adjusted to the position illustrated in Fig. 2, the hydrocarbon vapors in line 11 pass through valve V—3 into line 14 from which they are supplied to reactor 12 containing the catalytic material in the form of granules. The temperature employed in the catalytic reforming step lies preferably within the approximate limits of 750–1200° F. while employing pressures which may vary from mildly superatmospheric to approximately 1000 pounds per square inch. The hydrocarbon reactants leave reactor 12 by way of line 15 from which they pass through valve V—4 to enter line 16, valve V—4 being in the position illustrated in Fig. 3. After passing through valve 17 the hydrocarbon reactants are preferably quenched by well known means not shown in the drawing by hydrocarbon cooling oil, as for example, heavy products formed in the process itself, and enter fractionating column 18 wherein the gasoline and lighter products are fractionated from the higher boiling material. The higher boiling products separated in fractionator 18 are removed by way of line 19 controlled by valve 20 and collected as a product of the process. The gasoline and lower boiling products are removed from fractionating column 18 by way of line 21 and are directed to cooler and condenser 22. The mixture of liquid and vapors leaving cooling coil 22 enters line 23 and after passing through valve 24 enters receiver and separator 25. A portion of the liquid product collected in receiver 25 enters pump 27 by way of line 26 and is discharged into line 28 controlled by valve 29 and is supplied to fractionating column 18 for cooling and reflux. The remainder of the liquid collected in receiver 18 enters pump 31 by way of line 30 and is discharged into line 32 controlled by valve 33 and is supplied to stabilizing column 34. Stabilizing column 34 operates in the conventional manner and is used to produce a motor fuel of the proper volatility, the stabilized product being removed from column 34 by way of line 35 controlled by valve 36. The overhead product from stabilizer 34 is removed by way of line 37 and directed to cooler and condenser 38 from which the mixture of condensed liquid and uncondensed and undissolved vapors enters line 39 which discharges into receiver and separator 40. The liquid separating in receiver 40 is removed by way of line 40 and enters pump 42 which discharges into line 43 controlled by valve 44 from which it is returned to stabilizer 34 for cooling and reflux.

The gases separated in receiver 25 are removed by way of line 45 and after passing through valve 46 enter compressor 47 which discharges into line 48 and after passing through valve 49 are commingled with the gases obtained from receiver 40. The stabilizer gases obtained from receiver 40 are removed by way of line 50 and after passing through valve 51 enter compressor 52 which discharges into line 48 wherein said stabilizer gases are commingled with the gases obtained from receiver 25 as hereinbefore set forth. This mixture of gases then passes through valve 53 and enters absorber 54 wherein the greater portion of the hydrocarbon constituents thereof are dissolved in an absorbing oil. The rich absorption oil is removed from the bottom of the absorber 54 by way of line 55 and after passing through pump 56 is discharged into line 57 controlled by valve 58. Line 57 discharges into stripping column 59 wherein the light hydrocarbon constituents are dissolved from the heavier absorption oil. The lean absorption oil leaves stripper 59 by way of line 60 and enters pump 61 discharging into line 62 controlled by valve 63 from which it is returned to absorber 54 for reuse. The light hydrocarbon gases stripped from the absorption oil are removed from stripper 59 by way of line 64 controlled by valve 65. Stripper 59 may be operated in a number of conventional ways. If desired, steam may be used to aid in removing the light dissolved constituents from the heavier oil.

The gases leaving absorber 54 by way of line 66 consists principally of hydrogen, together with smaller quantities of light gaseous hydrocarbons. These hydrogen-containing gases are directed in part to line 67 and after passing through valve 68 enter compressor 69, discharging into line 6 wherein they are commingled with the charging stock for the process for treatment as hereinbefore set forth. Another portion of these hydrogen-containing gases is conducted from line 66 into line 69 and after entering compressor 70 are discharged into line 71 from which they enter heating coil 72 so disposed as to receive heat from furnace 73. The hydrogen-containing gases are discharged from heating coil 72 at a temperature between the approximate limits of 500–1200° F. and at a pressure which may vary from approximately 50 to about 2000 pounds per square inch and enter line 74 from which they are directed through three-way valve V—1. The heated hydrogen-containing gases are used for partial reactivation of the catalyst as hereinbefore set forth. With valve V—1 in the position as shown in the drawing, these heated hydrogen-containing gases enter line 75 after which they pass through three-way valve V—2 to enter line 76. From line 76 these heated hydrogen-containing gases pass through valve V—3 which is in the position shown by Fig. 2. After passing through valve V—3 they enter line 77 from which they are supplied to reactor 13 wherein they come in contact with the contaminated catalyst. As hereinbefore set forth the hydrogen hydrogenates the carbonaceous deposits forming volatile hydrocarbons, the mixture of hydrogen and hydrocarbons leaving reactor 13 by way of line 78 and passes through four-way valve V—4 which is in the position shown in Fig. 3. This mixture of hydrogen and light gaseous hydrocarbons is then directed to line 79 controlled by valve 80 from which it may be removed from the process and used for fuel. If desired, this mixture of hydrogen and hydrogen-containing gases obtained from reactor 13 might be directed to absorber 54 for removal of the greater portion of the hydrocarbons and for recycling the hydrogen to the regenerating or conversion steps.

After the greater portion of the carbonaceous material has been removed by the hydrogen, the position of the valve V—1 is so changed that the hydrogen is cut off from line 75 and directed to line 81 controlled by valve 82 and removed from the system. The hydrogen removed during this portion of the cycle may be used as a fuel if so desired or may be returned to the system for reuse in the process. After the position of valve V—1 has been so changed as to direct the heated hydrogen to line 81, the position of valve V—2 is so changed as to permit the passage of an inert purging gas introduced to the system by way of line 83 controlled by valve 84 through valve V—2 to line 76 from which is passes through valve V—3 into line 77 and thence to reactor 13. After several minutes purging by the inert gas, air is introduced through line 83 and follows the same course as that just described for purging gas. The air, which has been previously heated to a temperature of at least 750° F., is used to oxidize the remaining portion of the carbonaceous deposits on the surface of the catalyst.

The following example shows the type of results obtainable by the use of the process comprising my invention.

A Mid-Continent naphtha of 52.5 A. P. I. gravity, 33.5 octane number by the C. F. R. motor method was passed over a catalyst consisting of 92% alumina and 8% chromium oxide at a temperature of approximately 1000° F. for a period of 6 hours. A ratio of 4 mols of hydrogen to one mol of the charging stock was used, the mixture being under a pressure of 15 pounds per square inch gauge. During this period, a yield of 76.3 volume per cent gasoline having an octane number of 79.0 by the C. F. R. motor method was obtained. The catalyst at this time was contaminated with carbon to the extent of 2.06% by weight. The catalyst was then reactivated by passing a stream of light gases consisting of 85% hydrogen, the remainder consisting of light gaseous hydrocarbons, principally methane, at a pressure of 1000 pounds per square inch and a temperature of 950° F. for a period of 30 minutes. A sample of the catalyst was taken at this time and found to contain 0.45% carbonaceous material. A combustion gas substantially oxygen-free was then passed through the catalyst for a period of 3 minutes in order to purge the system of hydrogen. A combustion gas containing 8 mol per cent of oxygen heated to a temperature of 1000° F. was then passed over the catalyst for a period of 15 minutes after which time a sample was taken of the catalyst and an analysis showed it to contain 0.07% carbon.

I claim as my invention:

In the reactivation of carbonized catalysts which are damaged by excessive combustion temperatures, the method of lowering the amount of heat generated during the reactivation which comprises subjecting the catalyst to hydrogenation until a major portion of the carbonaceous deposits has been hydrogenated and removed from the catalyst, and subjecting the thus partially reactivated catalyst to oxidation to burn an additional portion of the carbonaceous deposits therefrom.

CHARLES L. THOMAS.